United States Patent [19]

Miyazaki

[11] 4,428,049
[45] Jan. 24, 1984

[54] TRAINING MODE OPERATION IN AN ELECTRONIC CASH REGISTER

[75] Inventor: Ryuji Miyazaki, Kashiwara, Japan

[73] Assignee: Sharp Kabushiki Kaisha, Osaka, Japan

[21] Appl. No.: 272,579

[22] Filed: Jun. 11, 1981

[30] Foreign Application Priority Data

Jun. 20, 1980 [JP] Japan .............................. 55-84419
Jun. 20, 1980 [JP] Japan .............................. 55-84420
Jun. 20, 1980 [JP] Japan .............................. 55-84421

[51] Int. Cl.³ ........................................... G06F 15/20
[52] U.S. Cl. .................................... 364/405; 364/900
[58] Field of Search ................... 364/404, 405, 900; 434/107, 227, 232, 306

[56] References Cited

U.S. PATENT DOCUMENTS 4,159,533  6/1979  Sakurai ................................. 364/900
4,213,179  7/1980  Hamano et al. ...................... 364/405

*Primary Examiner*—Charles E. Atkinson
*Attorney, Agent, or Firm*—Birch, Stewart, Kolasch & Birch

[57] ABSTRACT

An electronic cash register includes a mode selection circuit for selectively placing the electronic cash register in a training mode. A memory of the electronic cash register includes an accumulation section for accumulating the transaction data registered in a normal registration mode, and a training mode memory section for storing the transaction data registered in the training mode. In the training mode, a predetermined symbol, for example, "TR" is printed on a receipt slip for indicating the training mode. The normal registration operation and the training operation are controlled by programs stored in a programmable read only memory which is associated with a central processor unit.

6 Claims, 3 Drawing Figures

TRAINING MODE OPERATION IN AN ELECTRONIC CASH REGISTER

BACKGROUND AND SUMMARY OF THE INVENTION

The present invention relates to an electronic cash register and, more particularly, to an electronic cash register capable of operating in a training mode.

Recently, the electronic cash register has been developed, which performs various functions such as the PLU (price-look-up) function. Thus, the handling thereof becomes relatively complicated. In a supermarket, a training machine is often used to train a fresh clerk. However, it is more convenient that the training is conducted through the use of an actual operating electronic cash register when few customers are in the store. In such a case, it is required that the training data not be mixed with the actual transaction data previously introduced.

Accordingly, an object of the present invention is to provide an electronic cash register which can operate in a training mode.

Another object of the present invention is to provide a control system in an electronic cash register, which functions to separate the training data from the actual transaction data.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a mode selection switch is provided to selectively place the electronic cash register in a training mode. In the training mode, a calculation result is introduced into a specific memory section in a main memory. The specific memory section is isolated from memory sections for storing an actual transaction data.

In a preferred form, a printer control is provided to print out a predetermined symbol on a receipt slip and/or a journal paper when a printing operation is conducted in the training mode.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
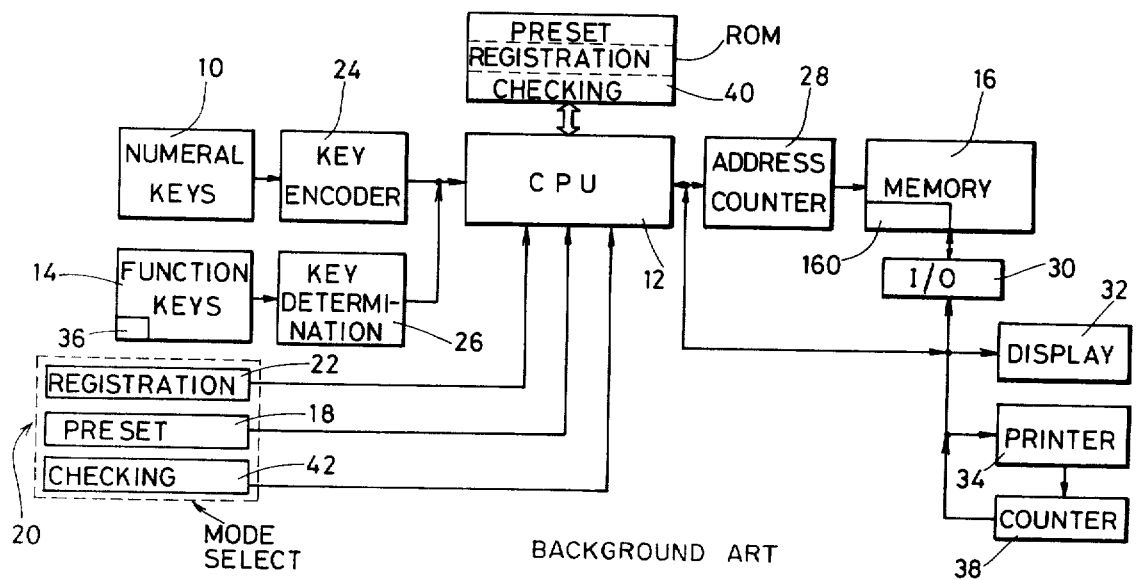
FIG. 1 is a block diagram of an electronic cash register of a known type.

Referring now in detail to the drawings, and to facilitate a complete understanding of the present invention, an electronic cash register of a known type will be first described with reference to FIG. 1.

The electronic cash register generally comprises a numeral information key input panel 10, a central processor unit 12, a function key panel 14 and a memory 16.

First, a preset mode key 18 included in a mode selection switch 20 is actuated to place the electronic cash register in the preset mode, wherein a specific data such as the unit cost information is preset in the electronic cash register. After completion of the preset operation, an registration mode key 22 included in the mode selection switch 20 is actuated to place the electronic cash register in the normal registration mode.

Now assume that the normal registration operation is conducted in the electronic cash register of FIG. 1 when eight items of the commodity of a department "6" are produced at a unit cost ￥ 300.

First, the numeral information "8" (representing the purchased number of the commodity) is introduced through the numeral information key input panel 10. The numeral data "8" is introduced into the central processor unit 12 via a key encoder 24. Then, the unit cost key included in the function key panel 14 is actuated to indicate that the next data represents unit cost information.

The key actuation is detected by a key determination circuit 26, and the central processor unit 12 is prepared to receive the unit cost information. The unit cost information (300) is introduced through the numeral information key input panel 10 into the central processor unit 12 via the key encoder 24. Thereafter, a department key "6" included in the function key panel 14 is actuated to indicate that the commodity belongs to the department "6". The central processor unit 12 receives a key input signal indicating that the commodity belongs to the department "6", via the key determination circuit 26. The central processor unit 12 conducts the calculation (8×300), and the calculation result ￥ 2,400) is introduced into and stored in a memory section assigned to the department "6" in the memory 16. More specifically, the memory section assigned to the department "6" is selected by an address counter 28, and the numeral data 2,400 is introduced into the selected memory section through an input/output circuit 30. The numeral data 2,400 is also applied to a display system 32. The numeral data 2,400 is further applied to a printer system 34 to print out the calculation result onto a receipt slip and/or a journal paper.

The above-mentioned registration operation is repeated to complete the registration operation related to a specific customer. When the registration operation related to one customer is completed, the operator actuates a total key 36 included in the function key panel 14 to indicate that the registration operation related to one customer is completed. The actuation of the total key 36 is detected by the key determination circuit 26, and the central processor unit 12 develops the registration completion signal. The total amount purchased by the customer is calculated, and the calculated total amount is applied to the display system 32 and to the printer system 34. The calculated total amount is further introduced into a memory section 160 for accumulating the total amount in the memory 16.

When the print operation conducted on the receipt slip is completed by the printer system 34, a receipt delivery counter 38 receives a control signal to count up the contents stored therein. The thus incremented counter contents are applied to the memory 16 for storing purposes.

The above-mentioned sequences of the operation are controlled by programs stored in a programmable read only memory 40. It will be clear that the programmable read only memory 40 stores programs related to the preset operation and the normal registration operation. The electronic cash register generally performs the checking operation when the checking mode is selected by a checking mode key 42 included in the mode selection switch 20.

Figures 2, 3:
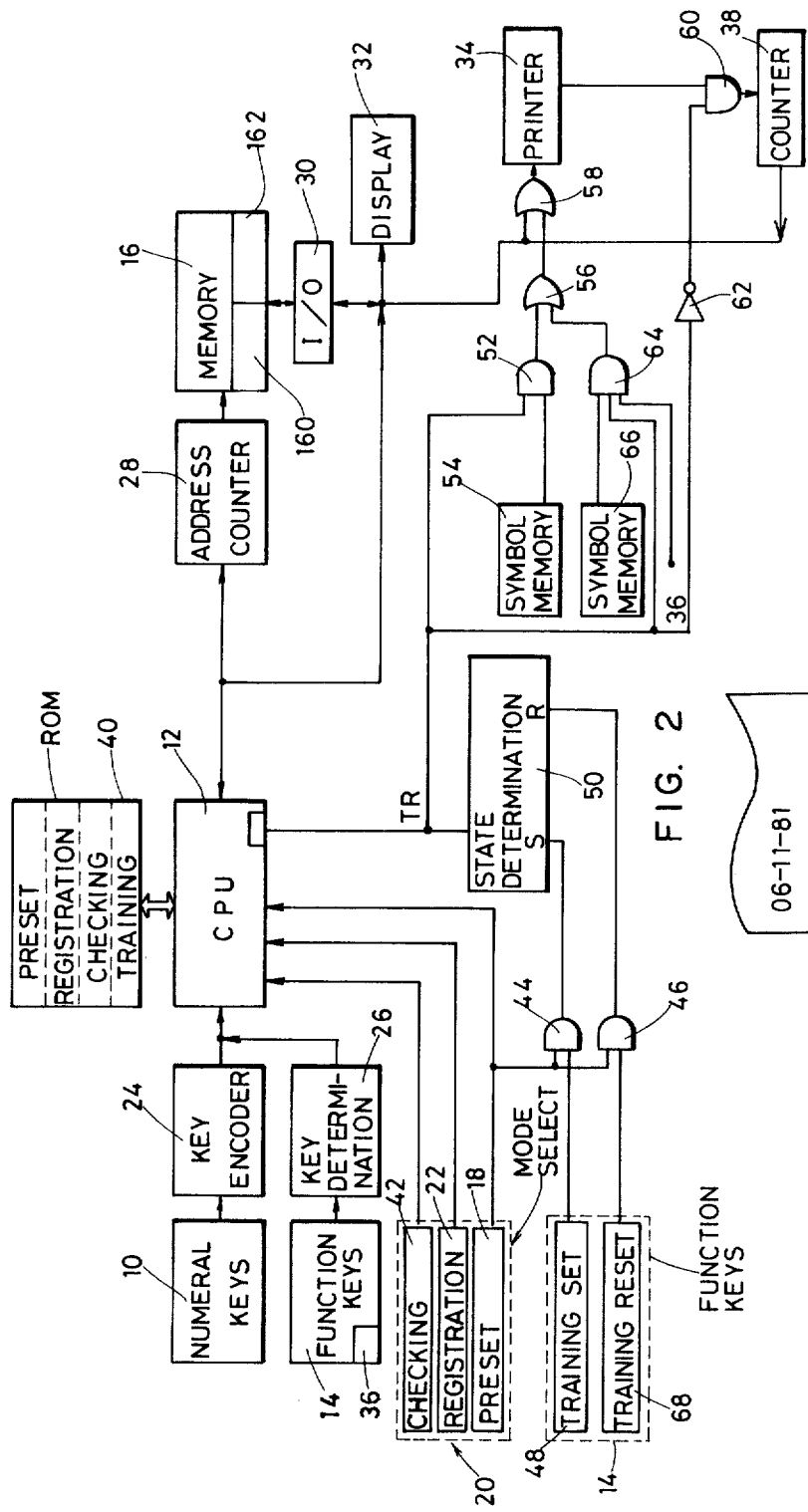
FIG. 2 is a block diagram of an embodiment of an electronic cash register of the present invention.
FIG. 3 is a schematic plan view showing an example of a printout developed by the electronic cash register of FIG. 2.

FIG. 2 shows an embodiment of an electronic cash register of the present invention. Like elements corresponding to those of FIG. 1 are indicated by like numerals.

For conducting the training operation, the preset mode key 18 included in the mode selection switch 20 is first actuated to place the electronic cash register in the preset mode. In response to the actuation of the preset mode key 18, AND gates 44 and 46 are placed in the operative condition. Then, a training mode set key 48 included in the function key panel 14 is actuated to set a state determination circuit 50 via the AND gate 44. A set output signal of the state determination circuit 50 (which is a training mode instruction signal TR) is applied to the central processor unit 12, thereby marking a training mode flag. Thus, a training mode program stored in the programmable read only memory 40 is selected to control the training operation.

The training mode instruction signal TR enables an AND gate 52. The electronic cash register of the present invention includes a symbol pattern memory 54 of which an output signal is applied to the printer system 34 through the AND gate 52 and OR gates 56 and 58. The symbol pattern memory 54 functions to print out a predetermined symbol on the receipt slip and/or the journal paper for indicating the training mode. A preferred symbol is "TR" as shown in FIG. 3. The training mode instruction signal TR further inhibits operation of an AND gate 60 via an inverter 62. Accordingly, the receipt delivery counter 38 does not operate in the training mode, whereby the receipt serial number is not increased in the training mode even when the receipt slip is delivered. Under these conditions, a fresh clerk can train under normal registration operation conditions. When the registration operation assigned to one customer is completed in the training mode, the total key 36 included in the function key panel 14 is actuated. The accumulation result is introduced into a training mode memory section 162 provided in the memory 16 through the use of the address counter 28 and the input/output circuit 30. The training mode memory section 162 is separate from the accumulation memory section 160.

In response to the actuation of the total key 36, an AND gate 64 is made operative. The electronic cash register of the present invention includes another symbol pattern memory 66, of which an output signal is applied to the printer system 34 through the AND gate 64 and the OR gates 56 and 58. A preferred symbol is shown in the bottom of FIG. 3, which is effective to distinguish the training mode amount from the normal registration data.

For conducting the normal registration operation, the preset mode key 18 included in the mode selection switch 20 is actuated to place the electronic cash register in the preset mode. A training mode reset key 68 included in the function key panel 14 is actuated to reset the state determination circuit 50. The registration program stored in the programmable read only memory 40 is selected to control the following operation. Then, the registration mode key 22 included in the mode selection switch 20 is actuated to place the electronic cash register in the normal registration operation mode. Under these conditions, the AND gates 52 and 64 are nonconductive. Further, the AND gate 60 is enabled to activate the receipt delivery counter 38.

The central processor unit 12 is preferably made of a microprocessor "Z-80" manufactured by Sharp Kabushiki Kaisha, and the programmable read only memory 40 is preferably made of "M-2732" manufactured by Mitsubishi Denki Kabushiki Kaisha.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
    keyboard means for introducing data into said register;
    processor means responsive to the information introduced by said keyboard means for controlling the operation of said cash register;
    program memory means for controlling operations in said processor means including operations during a training mode;
    data memory means for receiving transaction data from said processor means, said data memory means including,
        accumulation memory section means for accumulating transaction data during a normal registration operation mode, and
        training mode memory section means for storing transaction data during the training mode; and
    mode selection means for selecting between the normal registration operation mode and the training operation mode.

2. The electronic cash register of claim 1 wherein said mode selection means includes
    a registration mode key facilitating the selection of normal registration operation mode;
    a training mode set key facilitating placement of electronic cash register in the training operation mode; and
    a training mode reset key for releasing the electronic cash register from said training operation mode.

3. The electronic cash register of claim 1, further comprising printer means for printing out the transaction data onto a receipt slip.

4. The electronic cash register of claim 3, wherein said printer means includes control means for controlling said printer means to print a predetermined symbol on said receipt slip when the electronic cash register operates in said training operation mode.

5. The electronic cash register of claim 3 or 4, wherein said printer means includes counter means for accumulating the number of receipt slips delivered by said printer system.

6. The electronic cash register of claim 5, further comprising prohibiting means for precluding operation of said counter means when the electronic cash register is placed in said training operation mode.

* * * * *